United States Patent
Samantray

(10) Patent No.: US 8,510,261 B1
(45) Date of Patent: Aug. 13, 2013

(54) SYSTEM AND METHOD OF GENERATING IN-MEMORY MODELS FROM DATA WAREHOUSE MODELS

(75) Inventor: Lalitendu Samantray, Rourkela (IN)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/482,868

(22) Filed: May 29, 2012

(51) Int. Cl.
  *G06F 7/00* (2006.01)
  *G06F 17/00* (2006.01)

(52) U.S. Cl.
  USPC .......................................... 707/602

(58) Field of Classification Search
  USPC ......................................... 707/602, 999.102
  See application file for complete search history.

(56) References Cited

U.S. PATENT DOCUMENTS

| | | | |
|---|---|---|---|
| 6,161,103 A * | 12/2000 | Rauer et al. ............................. | 1/1 |
| 6,785,689 B1 * | 8/2004 | Daniel et al. .................. | 707/754 |
| 8,307,012 B2 * | 11/2012 | Thomas ........................ | 707/803 |
| 2004/0181538 A1 * | 9/2004 | Lo et al. ......................... | 707/100 |
| 2005/0228728 A1 * | 10/2005 | Stromquist ..................... | 705/30 |
| 2009/0281985 A1 * | 11/2009 | Aggarwal ......................... | 707/2 |
| 2011/0161387 A1 * | 6/2011 | Krueger et al. ............... | 707/825 |
| 2012/0054249 A1 * | 3/2012 | Batra et al. .................... | 707/803 |
| 2012/0246170 A1 * | 9/2012 | Iantorno ........................ | 707/748 |

OTHER PUBLICATIONS

DataStore Objects, retrieved from help.sap.com/saphelp_dm40/helpdata/en/f9/45503c242b4a67e10000000a114084/content.htm. Printed Mar. 26, 2012.

InfoCubes. retrieved from help.sap.com/saphelp_dm40/helpdata/en/8d/2b4e3cb7f4d83ee10000000a114084/content.htm. Printed Mar. 26, 2012.

InfoObject, retrieved from help.sap.com/saphelp_dm40/helpdata/en/23/054e3ce0f9fe3fe10000000a114084/content.htm. Printed Mar. 26, 2012.

InfoObjects as InfoProvider; retrieved from help.sap.com/saphelp_dm40/helpdata/en/c4/b007720ae4c248b945bb16f24bba31/content.htm. Printed Mar. 26, 2012.

InfoProviders, retrieved from help.sap.com/saphelp_dm40/helpdata/en/4d/c3cd3a9ac2cc6ce10000000a114084/content.htm. Printed Mar. 26, 2012.

InfoSet, retrieved from help.sap.com/saphelp_dm40/helpdata/en/ed/084e3ce0f9fe3fe10000000a114084/content.htm. Printed Mar. 26, 2012.

Multi-Dimensional Modeling with BI, A background to the Techniques Used to Create BI InforCubes, an SAP document, Version 1.0, May 16, 2006.

MultiProviders, retrieved from help.sap.com/saphelp_dm40/helpdata/en/52/1ddc37a3f57a07e100000009b38f889/content.htm. Printed Mar. 26, 2012.

Strategic Data Solutioins, for SAP BW InfoProviders, retrieved from sd-solutions.com/SAP-HCM-BW-InforProviders,html. 2009.

SAP HANA(TM) for Next-Generation Business Applications and Real-Time Analytics, SAP AG. 2011.

* cited by examiner

*Primary Examiner* — Aleksandr Kerzhner
(74) *Attorney, Agent, or Firm* — Fountainhead Law Group PC

(57) ABSTRACT

A system and method of outputting data from an in-memory database. The method includes converting a first data model (which is unable to be used by the in-memory database) into a second data model (which is), and outputting data according to the second data model. In this manner, a user does not have to rewrite the first data model in order to access the in-memory database.

20 Claims, 2 Drawing Sheets

SYSTEM AND METHOD OF GENERATING IN-MEMORY MODELS FROM DATA WAREHOUSE MODELS

CROSS REFERENCE TO RELATED APPLICATIONS

Not applicable.

BACKGROUND

1. Technical Field

The present disclosure relates to data processing, and in particular, to analytic data processing.

2. Description of the Related Art

Unless otherwise indicated herein, the approaches described in this section are not prior art to the claims in this application and are not admitted to be prior art by inclusion in this section.

Data processing is a diverse field. Two types of data processing are transactional data processing and analytical data processing. Transactional data processing concerns transactional data, which represents the individual transactions that the transactional data processing system is managing; examples include order processing, invoice processing, etc. Transactional data processing is often performed using a database management system (DBMS)—more specifically, a row-oriented database system—which is often referred to as a "traditional" DBMS (in order to distinguish it from a non-traditional DBMS, which is not a row-oriented database system). Transactional data processing may be referred to by the acronym OLTP (online transaction processing).

Analytical data processing concerns analytical data, which represents collections of transactional data; examples include total value of sales over a time period, average daily balance of account receivables, etc. Analytical data processing may be performed using a traditional DBMS in which the data is periodically loaded (often as summary data) from a transactional data processing system in a process referred to as extraction, translation and loading (ETL). Often the ETL process is performed one per day, e.g. at night when the transactional processing system is lightly loaded. Analytical data processing systems may be referred to as data warehouses (DWs), business warehouses (BWs, for instances in which "data" is implicit or understood), business intelligence (BI) systems, data marts (DMs), etc. Analytical data processing may be referred to by the acronym OLAP (online analytical processing).

One reason why data processing is split onto two systems is that the analytical queries used for analytic data processing often "lock" all the data that they are operating upon, to prevent that data from changing mid-query; such locks may slow down the performance of the system for performing additional transactions. One downside of splitting data processing onto two systems is that, due to the periodic nature of the ETL process, the analytical data is out of date.

In an analytical data processing system, a core analysis concept is the analysis cube (also called a "multidimensional cube" or a "hypercube"). It consists of numeric facts called measures which are categorized by dimensions. The cube metadata is typically created from a star schema or snowflake schema of tables in a relational database. Measures are derived from the records in the fact table and dimensions are derived from the dimension tables. Each measure can be thought of as having a set of labels, or meta-data associated with it. A dimension is what describes these labels; it provides information about the measure.

The analysis cube is one of a number of data structures that are used to create data models (also referred to as just "models"). Models are generally used to analyze data, including ways to view data, ways to select data, etc. In general, a number of models are created in a particular analytical data processing system; these models correspond to frequently-performed data analysis operations on the particular data stored by the analytical data processing system. For example, the models used by Company X will differ from the models used by Company Y due to the differences in the structures of the underlying data of both companies.

Recent developments in in-memory technology have implemented in-memory databases in analytic data processing systems in place of the traditional DBMS. An example of an in-memory data processing system is the HANA™ system from SAP AG. An in-memory data processing system may perform both transactional and analytic data processing due to the speed available from storing the data in memory (as opposed to the disk storage of non-in-memory database systems).

SUMMARY

Once the underlying data has been consolidated into an in-memory data processing system from separate OLAP and OLTP systems, users still need ways to access the analytical data. The user's existing models will not work because of the differences in structure between the OLAP system and the in-memory data processing system. For example, the OLAP system is often a traditional RDBMS (which stores data in a row structure), whereas the in-memory system stores data in a column structure. One way to address this issue is to rewrite the models.

Given the above discussion, there is a need to convert models instead of rewriting. An embodiment is directed toward converting models from non-in-memory data processing systems to in-memory data processing systems.

One embodiment is a method of outputting data by an in-memory database system that stores the data. The method includes storing, by the in-memory database system, a first data model that corresponds to accessing first data stored by a data warehouse system. The method further includes storing second data by the in-memory database system. The method further includes converting, by the in-memory database system, the first data model to a second data model that corresponds to accessing the second data. The method further includes outputting, by the in-memory database system, the second data according to the second data model.

A computer system may operate to implement the method described above. The computer system may store, execute or be otherwise controlled by one or more computer programs that control the computer system to implement the method described above.

A non-transitory computer readable medium may store instructions to control a computer system to perform the method described above. The instructions may include an in-memory database component, a processing component, and an output component.

The following detailed description and accompanying drawings provide a better understanding of the nature and advantages of the present disclosure.

DETAILED DESCRIPTION

Figure 1:
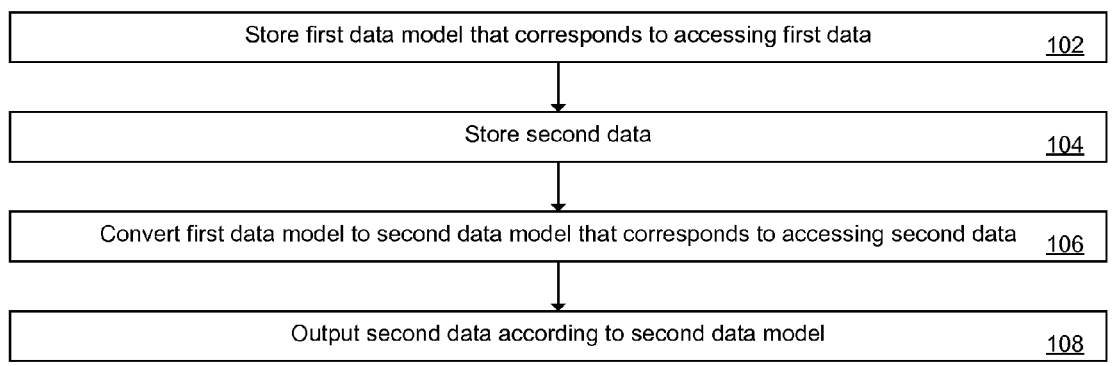
FIG. 1 is a flowchart of a method of outputting data by an in-memory database system that stores the data.

Described herein are techniques for outputting data from an in-memory database. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step only when the first step must be completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

In this document, various computer-implemented methods, processes and procedures are described. It is to be understood that the various actions (receiving, storing, sending, communicating, displaying, etc.) are performed by a hardware device, even if the action may be authorized, initiated or triggered by a user, or even if the hardware device is controlled by a computer program, software, firmware, etc. Further, it is to be understood that the hardware device is operating on data, even if the data may represent concepts or real-world objects, thus the explicit labeling as "data" as such is omitted. For example, when the hardware device is described as "storing a record", it is to be understood that the hardware device is storing data that represents the record.

In this document, specific examples are discussed in the context of SAP systems, such as a SAP BI system or DW system (a non-in-memory system) and a SAP HANA system (an in-memory system). It is to be understood that the actions performed on SAP-specific structures of the non-in-memory system (e.g., InfoCubes) may also be performed on non-SAP structures (e.g., analysis cubes, multidimensional cubes, hypercubes, etc.) in order to convert the models for use with an in-memory system. In addition, the systems described herein may include one or more computers that may be connected via communication links such as a local area network or internet.

As mentioned above, there is a very strong (more than 10000) install base of SAP BW and a large number of customers who have already invested a huge amount of money in modeling their warehouses and datamarts. Now when they upgrade to BW on HANA scenario (HANA used as database for BW) they have to invest again a huge amount of money to create the HANA analytic models in order to use SAP Business Objects tools such as Explorer etc. Also in many times customers have or want to have their custom applications built using any UI technology based on their needs which want to consume BW data. They can get the data from HANA directly; however in order to use the analytical capabilities of HANA they need to create the models manually on top of the BW schema tables which might result in a huge effort and cost for these customer.

As further detailed below, an automatic process creates HANA analytical models on top of the BW schema tables present in HANA (database) which store the BW data. (The HANA models are different than the BW models and hence cannot be converted one-to-one.) The application's intelligence interprets the BW model's semantics and creates corresponding semantics for the HANA model.

For example, Attribute View can be created in HANA for each InfoObject in BW. Analytic View can be created for an InfoCube/Operational Data store Object. For BW MultiProvider and InfoSet, in HANA Calculation View can be created which takes care of both union and join scenarios. For Analytical authorization, HANA Analytic Privilege can be created.

A general use case is with Business Objects reporting tools. Business Objects reporting tools such as Explorer can directly report on top of HANA models. So by converting the BW InfoProviders to HANA models, the system exposes them to Explorer in which user friendly reports can be created.

One noteworthy feature of certain embodiments is that no separate modeling is required. The conversion intelligently identifies the analytical settings of BW models and then applies the corresponding analytical settings to the HANA models wherever applicable. HANA models and their semantics are different than the BW models; however, the conversion takes care of interpreting the BW model semantics and then creates the HANA model's semantics appropriately. This reduces significant modeling effort and cost to the customer.

Another noteworthy feature of certain embodiments is that no data replication is required from the BW. The conversion utility identifies the underlying database schema from metadata of the BW models and creates the HANA views on top of them. Hence there is no need for special schema creation in HANA and there is no separate dataloading required for these HANA models.

Another noteworthy feature of certain embodiments is the customer-specific reports. HANA models when deployed create runtime objects which are MDX (Multidimensional Expressions) compliant. These views can be accessed using JDBC (Java™ database connectivity). Hence when BW reports still run in undisrupted way, customers also have an option to create their custom reports or dashboards based on their needs using HTML5(hypertext markup language version 5) or any other user interface technology and use JDBC to execute their multi-dimensional queries on the HANA models. This way they can directly access BW data with all desired analytical capabilities such as slicing, dicing, aggregation etc. These analytical operations get executed in HANA and hence enabling them to meet their fast reporting needs.

Example Embodiments

As further detailed below, embodiments may be used where an SAP BW customer who uses HANA as database for the BW system can create HANA Information models such as Attribute View, Analytic View, Calculation View, Analytic Privilege, etc. automatically from the BW models such as InfoObject, InfoCube, Operational Datastore Object (DSO), Infoset, MultiProvider, etc. The specifics of each of these are discussed below.

InfoObject Handling—Characteristic

For a Characteristic InfoObject in the BW, the system creates a shared Attribute view in HANA. If the characteristic is not shared across many InfoProviders, then this can be created as private attribute in the specific Analytic/Calculation view (corresponding to InfoProvider like InfoCube or DSO, etc.) where it is used.

The system may generate the characteristic SID (system identifier) table, master data, text table, etc. as part of the data foundation. The system may derive joins using standard BW logic; e.g., SID table and master data and text tables may be joined using a referential join on CHAVL (characteristic value) field, and LANGU (language) in text table may be selected as language attribute in the text join.

Note that for Currency and Unit characteristics, the system may add the standard currency, currency text, unit and unit text tables to the shared Attribute View's data foundation.

InfoObject Handling—Key figure

There is no shared Measure in HANA. Hence the system handles the BW key figures in the context of the InfoProvider itself. The system converts the BW key figures by creating private Measures in the HANA Information model.

InfoCube Handling

The system may create the HANA model for an HANA Optimized InfoCube which is the new enhancement on InfoCube to have a very simplified schema against the classical BW extended star schema.

For BW InfoCube, the system creates an Analytic View in HANA. Data foundation contains the InfoCube F-fact table.

In case there is a need to create private Attributes, the system generates the SID table and other tables as part of the data foundation. The system creates referential joins as per standard BW logic—SID field in the SID table is joined with SID_<CharacteristicName>field in fact table.

In case the characteristic used in InfoCube is already created in HANA as shared Attribute View, the system adds the Attribute View to the Logical View of Analytic View. Again, the system creates the join between the Data foundation and this characteristic in Logical View using SID of the characteristic.

For key figures in InfoCube, the system creates private Measures in Analytic View. This takes the same description as in Key figure. Other analytical properties such as "Aggregation Type", "Unit of measure", "Currency" etc. are also set accordingly.

Restricted and Calculated Key Figures

If there are restricted and calculated key figures defined at InfoCube level, the system creates Restricted Measure or Calculated Measure in HANA with similar restriction and formula in the Analytic View. If there are Navigational Attributes on the InfoCube they are created as private attributes in the Analytic View, the same way as other characteristics. Data foundation of this will consist of Attribute table of the parent characteristic and Text table of the attribute characteristic.

Operational Datastore Object (DSO) Handling

The system may create a HANA model for the IMO DSO (InMemory Optimized DSO), which is the enhanced version of DSO specifically designed for HANA system. IMO DSO has an Active data table which contains the entire data. This table may be part of the data foundation. The remaining conversion steps are similar to those provided in the InfoCube section above.

MultiProvider Handling

For BW MultiProvider, the system creates a Calculation View in HANA. The part providers can be any BW InfoProvider such as—InfoObject, InfoCube, DSO, InfoSet, etc. The system creates corresponding types of models for each part provider in the MultiProvider (as detailed in the respective sections above). The system includes these models in the Calculation View as "Data Sources" (nodes) and then joins them using the "Union" node. Attribute mapping is done between the source and target data sources based on the mapping in the MultiProvider.

InfoSet handling

For BW InfoSet, the system creates a Calculation View in HANA. This is processed very similar to MultiProvider (see above). The system creates the underlying part providers as respective models in HANA. The part providers are included in the Calculation View as data sources and joined using a Join. The system selects appropriate attributes in the join based on the metadata of the InfoSet.

Further Details

The following sections provide additional details regarding the conversion of models from a non-in-memory system to an in-memory system. A general use case is as follows. First, the modeler (user) uses the in-memory system (e.g., HANA) to connect to the non-in-memory system (e.g., BW) in order to browse through the InfoProviders stored by the non-in-memory system. The in-memory system may implement this connection using JCO (SAP Java™ connector). Second, the modeler selects an InfoProvider. Third, the in-memory system generates Information models in the in-memory system that correspond to the selected InfoProvider (in the non-in-memory system). The in-memory system generates these Information models by including the InfoProvider schema in the data foundation so that there is no need for data replication. The in-memory system may set the Information Model properties from the InfoProvider metadata. The in-memory system may read the metadata using the existing RFCs (remote function calls) and BAPIs (business application programming interfaces) implemented by the BW.

The in-memory system may use the following BAPIs to obtain information from the BW: BAPI_CUBE_GETLIST (to get a list of InfoCubes), BAPI_CUBE_GETDETAIL (to get the InfoCube details), and BAPI_JOBJ_GETDETAIL (to get the InfoObject details). The in-memory system may also interact with one or more of the following 11 APIs of the BW in order to perform the conversion.

1. The BW may implement a Browse API that implements an interface for browsing through the existing InfoAreas and InfoProviders in BW system. This API may provide the objects under a given InfoArea. This output may also include the InfoAreas under it. As import parameters, the Browse API may receive the InfoArea name and the table of types (such as AREA, CUBE, ODSO, MPRO, etc.). As an export parameter, the Browse API may send a table of object header (name, long text, type, etc.).

2. BAPI_CUBE_GETLIST may return only FLAT InfoCubes (not all of them); Similarly BAPI_ODSO_GETLIST may return only FLAT InMemory Optimized DSOs.

3. The BW may implement an API to get complete metadata of multiple InfoObjects. As an import parameter, the API may receive a table of InfoObject name. As an export parameter, the API may send a table of InfoObject metadata.

4. The BW may implement an API to get complete metadata of multiple InfoCubes. This is similar API as #2 for InfoCube metadata.

5. The BW may implement an API to get complete metadata of multiple Data store objects. Similar API as #2 for DSO metadata.

6. The BW may implement an API to get complete metadata of multiple Provider including the part providers.

7. The BW may implement a list API for queries.

8. The BW may implement a list API for restricted key figures on an InfoProvider.

9. The BW may implement an API to get details of restricted key figures (multiple together).

10. The BW may implement a list API for calculated key figures.

11. The BW may implement an API to get details of calculated key figures (multiple).

Conversion Details and Detailed Workflow

The in-memory system converts a model according to the following general procedure. First, the system turns a Cube into an Analytic view (AV) with cube fact table (referred to as an AV fact table). The SID and X/Y tables may be associated with the AV data foundation. Second, the system receives user input selecting the target package. For example, the user may want to generate the target package locally, may want to transport the target package, etc. Third, the system finds shared dimensions generated by other cubes. One way to do this is to have the package as a central configuration together with logon data.

Fourth, the system turns the Characteristics (also time and unit) into shared attribute views. The data foundation (DF) contains P table and T table (Q table as well if time dependency is supported; see below). The system converts Compound to Key Attributes. For navigation attributes, the system fills the properties "Navigation enabled".

Fifth, the system converts the time dependency for text as well as attributes using the date (and the $$date$$ constraint). One way to do this is to specify a fix constraint for the dateTo column.

Finally, the system fills the origin with sufficient data to find out what was the original model.

The system may present a wizard to the user as part of performing the conversion. The wizard should be restartable in case one wants to rework the cube (e.g., after the cube has been changed in BW). For this a minimal merge may be supported, because the customer is allowed to enhance the converted model (at lease keep the customer created hierarchies during the merge).

The steps performed according to the wizard (e.g., the system presents the choices and the user selects one of the choices for the system to perform the conversion) are as follows:

1. Choose InfoCube (search/optional-display InfoArea hierachy).

2. Choose (sub)package (optional-starting from the package maintained centrally for that system)/

3. Choose Characteristics to be converted into shared attribute views with the possibility to propose/select already existing attribute views for reuse. The reuse is in particular relevant for the time dimension. One may use the origin to search for already generated attribute views that are not yet included into the existing search.

4. Choose key figures (optional-default: all key figures).

5. Choose authorizations (optional).

The wizard may include further options. One further option is to offer the choice to just generate the DF and then allow the user to do the logical model. Another further option is to store what has been generated and reuse this information for a better merge. A repository object may be used for this storage.

FIG. 1 is a flowchart of a method 100 of outputting data by an in-memory database system that stores the data. The method may be implemented as a computer program that controls the operation of the in-memory database system.

At 102, the in-memory database system stores a first data model that corresponds to accessing first data stored by a data warehouse system. As discussed above, the first data model corresponds to an existing model for a BW system. The BW system differs from the in-memory system (e.g., the BW system implements row-oriented storage and the in-memory system implements column-oriented storage), so the first data model will not properly extract the data from the in-memory system. The in-memory database system may store the first data model after obtaining the first data model from a BW system, for example via the APIs discussed above.

At 104, the in-memory database system stores second data. In general, the second data (stored by the in-memory system) corresponds to the first data (stored by the BW system) because the in-memory system is replacing the BW system to perform the OLAP tasks of the organization.

At 106, the in-memory database system converts the first data model to a second data model that corresponds to accessing the second data. The details of the conversion process are as discussed above. Note that without conversion, the first data model will not properly operate to access the second data.

At 108, the in-memory database system outputs the second data according to the second data model. This output may be in the form of views, reports, etc. according to the desired OLAP functionality of the in-memory system, according to the converted data model.

Figure 2:
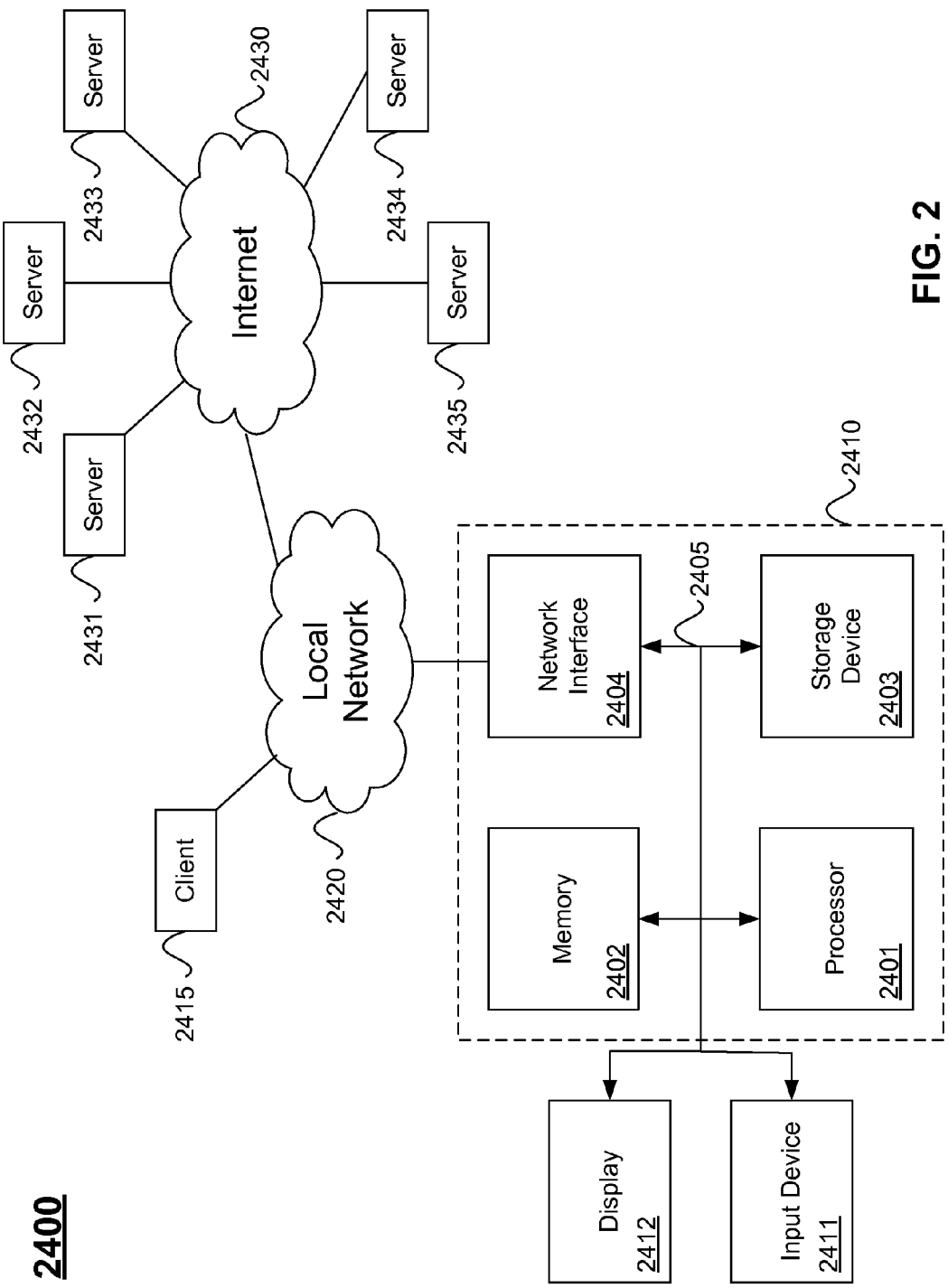
FIG. 2 is a block diagram of an example computer system and network for implementing embodiments of the present disclosure.

FIG. 2 is a block diagram of an example computer system and network 2400 for implementing embodiments of the present disclosure. Computer system 2410 includes a bus 2405 or other communication mechanism for communicating information, and a processor 2401 coupled with bus 2405 for processing information. Computer system 2410 also includes a memory 2402 coupled to bus 2405 for storing information and instructions to be executed by processor 2401, including information and instructions for performing the techniques described above. This memory may also be used for storing temporary variables or other intermediate information during execution of instructions to be executed by processor 2401. Possible implementations of this memory may be, but are not limited to, random access memory (RAM), read only memory (ROM) (when not storing temporary variables or other intermediate information), or both. A storage device 2403 is also provided for storing information and instructions. Common forms of storage devices include, for example, a hard drive, a magnetic disk, an optical disk, a CD-ROM, a DVD, a flash memory, a USB memory card, a solid state drive, or any other medium from which a computer can read. Storage device 2403 may store source code, binary code, or software files for performing the techniques or embodying the constructs above, for example.

Computer system 2410 may be coupled via bus 2405 to a display 2412, such as a cathode ray tube (CRT) or liquid crystal display (LCD), for displaying information to a computer user. An input device 2411 such as a keyboard and/or mouse is coupled to bus 2405 for communicating information and command selections from the user to processor 2401. The combination of these components allows the user to communicate with the system. In some systems, bus 2405 may be divided into multiple specialized buses.

Computer system 2410 also includes a network interface 2404 coupled with bus 2405. Network interface 2404 may provide two-way data communication between computer system 2410 and the local network 2420. The network interface 2404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 2404 sends and receives electrical, electromagnetic, or optical signals that carry digital data streams representing various types of information.

Computer system 2410 can send and receive information, including messages or other interface actions, through the network interface 2404 to an Intranet or the Internet 2430. In the Internet example, software components or services may reside on multiple different computer systems 2410 or servers 2431, 2432, 2433, 2434 and 2435 across the network. A server 2431 may transmit actions or messages from one component, through Internet 2430, local network 2420, and network interface 2404 to a component on computer system 2410.

The computer system and network 2400 may be configured in a client server manner. For example, the computer system 2410 may implement a server. The client 2415 may include components similar to those of the computer system 2410.

More specifically, as described above, the computer system 2410 may implement an in-memory database system. The computer system 2410 may implement the model conversion process described above. Alternatively, the server 2431 may implement the model conversion process and may present the converted model to the computer system 2410, which case the server 2431 may be considered a component of the in-memory database system. The server 2432 may implement the BW system.

The above description illustrates various embodiments along with examples of how aspects of the present invention may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A computer-implemented method of outputting data by an in-memory database system that stores the data, comprising:
   storing, by the in-memory database system, a first data model that corresponds to accessing first data stored by a data warehouse system, wherein the first data model includes a data cube and a characteristic;
   storing second data by the in-memory database system, wherein the in-memory database system is unable to access the second data using the first data model;
   converting, by the in-memory database system, the first data model into a second data model that corresponds to accessing the second data, wherein converting the first data model into the second data model includes converting the data cube into an analytic view and converting the characteristic into a shared attribute view; and
   outputting, by the in-memory database system, the second data according to the second data model.

2. The method of claim 1, wherein the first data model corresponds to the first data stored in a row-oriented format.

3. The method of claim 1, wherein the second data model corresponds to the second data stored in a column-oriented format.

4. The method of claim 1, wherein the second data model corresponds to the second data stored in both a row-oriented format and a column-oriented format.

5. The method of claim 1, wherein the in-memory database system is unable to access the second data using the first data model because the second data is stored in a column-oriented format that differs from a row-oriented format.

6. The method of claim 1, wherein the in-memory database system is unable to access the second data using the first data model because the second data is stored in both a row-oriented format and a column-oriented format that differs from the row-oriented format.

7. The method of claim 1, wherein the in-memory database system is unable to access the second data using the first data model because the second data is not stored only in a row-oriented format.

8. The method of claim 1, wherein the first data model relates to the data cube and the second data model relates to an in-memory data structure.

9. A system for outputting data, comprising:
   a memory implementing an in-memory database that is configured to store a first data model that corresponds to accessing first data stored by a data warehouse system, and is configured to store second data, wherein the first data model includes a data cube and a characteristic, and wherein the in-memory database system is unable to access the second data using the first data model; and
   a processor that is configured to convert the first data model into a second data model that corresponds to accessing the second data, wherein converting the first data model into the second data model includes converting the data cube into an analytic view and converting the characteristic into a shared attribute view,
   wherein the processor is configured to control the in-memory database to output the second data according to the second data model.

10. The system of claim 9, wherein the first data model corresponds to the first data stored in a row-oriented format.

11. The system of claim 9, wherein the second data model corresponds to the second data stored in a column-oriented format.

12. The system of claim 9, wherein the in-memory database component is unable to access the second data using the first data model because the second data is stored in a column-oriented format that differs from a row-oriented format.

13. The system of claim 9, wherein the in-memory database component is unable to access the second data using the first data model because the second data is stored in both a row-oriented format and a column-oriented format that differs from the row-oriented format.

14. The system of claim 9, wherein the first data model relates to the data cube and the second data model relates to an in-memory data structure.

15. A non-transitory computer readable medium storing instructions to control a computer system for outputting data, comprising:
   an in-memory database component that is configured to control the computer system to store a first data model that corresponds to accessing first data stored by a data warehouse system, and is configured to store second data, wherein the first data model includes a data cube and a characteristic, and wherein the in-memory database system is unable to access the second data using the first data model;

a processing component that is configured control the computer system to convert the first data model into a second data model that corresponds to accessing the second data, wherein converting the first data model into the second data model includes converting the data cube into an analytic view and converting the characteristic into a shared attribute view; and an output component that is configured control the computer system to output the second data according to the second data model.

16. The non-transitory computer readable medium of claim 15, wherein the first data model corresponds to the first data stored in a row-oriented format.

17. The non-transitory computer readable medium of claim 15, wherein the second data model corresponds to the second data stored in a column-oriented format.

18. The non-transitory computer readable medium of claim 15, wherein the in-memory database component is unable to access the second data using the first data model because the second data is stored in a column-oriented format that differs from a row-oriented format.

19. The non-transitory computer readable medium of claim 15, wherein the in-memory database component is unable to access the second data using the first data model because the second data is stored in both a row-oriented format and a column-oriented format that differs from the row-oriented format.

20. The non-transitory computer readable medium of claim 15, wherein the first data model relates to the data cube and the second data model relates to an in-memory data structure.

* * * * *